United States Patent
Tian et al.

(10) Patent No.: US 10,800,915 B2
(45) Date of Patent: Oct. 13, 2020

(54) POLYCARBONATE COMPOSITION AND PREPARATION METHOD THEREOF

(71) Applicant: KINGFA SCI. & TECH. CO., LTD., Guangdong (CN)

(72) Inventors: Zhengyu Tian, Guangdong (CN); Donghai Sun, Guangdong (CN); Yin Cen, Guangdong (CN); Wei Tong, Guangdong (CN); Xiang Xie, Guangdong (CN); Xianwen Liu, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 74 days.

(21) Appl. No.: 15/576,852

(22) PCT Filed: May 27, 2016

(86) PCT No.: PCT/CN2016/083630
§ 371 (c)(1),
(2) Date: Nov. 27, 2017

(87) PCT Pub. No.: WO2016/188476
PCT Pub. Date: Dec. 1, 2016

(65) Prior Publication Data
US 2018/0163046 A1    Jun. 14, 2018

(30) Foreign Application Priority Data
May 27, 2015    (CN) .......................... 2015 1 0277672

(51) Int. Cl.
*C08L 69/00*    (2006.01)
*C08L 55/02*    (2006.01)

(52) U.S. Cl.
CPC .............. *C08L 69/00* (2013.01); *C08L 55/02* (2013.01); *C08L 2201/08* (2013.01); *C08L 2205/025* (2013.01); *C08L 2205/035* (2013.01)

(58) Field of Classification Search
CPC ...... C08L 69/00; C08L 55/02; C08L 2201/08; C08L 2205/025; C08L 2205/035; C08K 5/523; C08K 5/11
USPC ......................................................... 524/127
See application file for complete search history.

(56) References Cited

U.S. PATENT DOCUMENTS 6,071,992 A * 6/2000 Okada ................... C08K 5/523
524/125

FOREIGN PATENT DOCUMENTS

| CN | 1395592 | 2/2003 |
| CN | 101993586 | 3/2011 |
| CN | 102516734 | 6/2012 |
| CN | 104877330 | 9/2015 |

OTHER PUBLICATIONS

CN 1395592 A, machine translation, EPO Espacenet. (Year: 2003).*
CN 101993586 A, machine translation, EPO Espacenet. (Year: 2011).*
CN 102516734 A, machine translation, EPO Espacenet. (Year: 2012).*
"International Search Report (Form PCT/ISA/210)", dated Aug. 31, 2016, with English translation thereof, pp. 1-4.

* cited by examiner

Primary Examiner — Josephine L Chang
(74) Attorney, Agent, or Firm — JCIPRNET

(57) ABSTRACT

A polycarbonate composition includes the following components in parts by weight: a. 30 to 87 parts of a PC resin; b. 8 to 50 parts of a rubber-modified graft polymer; c. 5 to 25 parts of a fire retardant; and d. 0 to 10 parts of other aids; wherein a sum of parts by weight of the four components a, b, c, and d is 100. Phenols which are added in a polycarbonate composition formula, based on a total weight of the polycarbonate composition does not exceed 100 ppm. A K value of a component I of the PC resin is adjusted between 300000 and 500000 and the K value of a component II is adjusted to be less than 300000.

22 Claims, No Drawings

POLYCARBONATE COMPOSITION AND PREPARATION METHOD THEREOF

CROSS-REFERENCE TO RELATED APPLICATION

This application is a 371 application of International PCT application serial no. PCT/CN2016/083630, filed on May 27, 2016, which claims the priority benefit of Chinese application no. 201510277672.1, filed on May 27, 2015. The entirety of each of the abovementioned patent applications is hereby incorporated by reference herein and made a part of this specification.

TECHNICAL FIELD

The present invention relates to the technical field of engineering plastics, particularly relates to a polycarbonate composition and a preparation method thereof.

BACKGROUND

Polycarbonate PC has properties such as a relatively high impact resistance and a heat resistance; and to improve its processability and overcome a disadvantage of being sensitive to a notch impact, rubber-modified polymers such as ABS, MBS and the like may generally be added. Particularly, a PC/ABS alloy having PC and ABS as main raw materials is widely applied in fields such as electronic and electrical appliances, office equipment and mobile phone industry. In present years, demands for miniaturization, weight reduction and thin wall are more and more urgent. In order to satisfy these demands, many improvements in an aspect of polycarbonate composition materials have been done, such as adding more contents of an ABS resin and modifying the ABS resin, reducing a molecular weight of a PC resin and so on. But these measures will more or less cause problems such as incompleteness of products, performance deterioration and heat resistance reduction.

Until now, no influences of phenols and a K value of the PC resin on the heat resistance and a flowability of a polycarbonate composition have been reported.

With a result of extensive experiments, the inventor surprisingly has found that, when the phenols which are added in a polycarbonate composition formula, based on a total weight of the polycarbonate composition does not exceed 100 ppm, and the K value of a component I of the PC resin is adjusted between 300000 and 500000 and the K value of a component II is adjusted to be less than 300000, the obtained polycarbonate composition has excellent heat resistance and flowability, particularly suitable for occasions with relatively high requirements for an operating environment.

SUMMARY OF THE INVENTION

To overcome disadvantages and shortcomings of the prior art, an object of the present invention is to provide a polycarbonate composition having an excellent heat resistance and flowability.

Another object of the present invention is to provide a preparation method of the above-described polycarbonate composition.

The present invention is accomplished by the following technical solution:

a polycarbonate composition, which includes the following components in parts by weight:

a. 30 to 87 parts of a PC resin;
b. 8 to 50 parts of a rubber-modified graft polymer;
c. 5 to 25 parts of a fire retardant; and
d. 0 to 10 parts of other aids;
wherein a sum of parts by weight of the four components a, b, c, and d is 100.

Preferably, a polycarbonate composition includes the following components in parts by weight:

a. 35 to 75 parts of the PC resin;
b. 8 to 35 parts of the rubber-modified graft polymer;
c. 5 to 20 parts of the fire retardant; and
d. 0 to 10 parts of other aids;
wherein a sum of parts by weight of the four components a, b, c, and d is 100,
a content of phenols based on a total weight of the polycarbonate composition is less than or equal to 100 ppm;
the PC resin consists of one or mixtures of a component I and/or a component II:
component I: a PC resin with a K value of 300000 to 500000;
component II: an aromatic PC resin with the K value less than 300000;
wherein a structural formula of the phenols is shown as Formula (1):

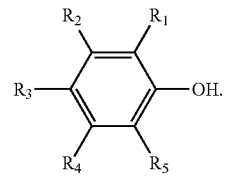

Formula (1)

Wherein, $R_1$ and $R_5$ represent a hydrogen group, an alkyl, an alkoxy, a hydroxyl, a carboxyl or a carbonyl, and an ester group, except for a hindered group; and $R_2$, $R_3$ and $R_4$ represent a substituent containing hydrogen atoms, preferably the hydrogen atom.

More preferably, a polycarbonate composition includes the following components in parts by weight:

a. 42 to 70 parts of the PC resin;
b. 8 to 30 parts of the rubber-modified graft polymer;
c. 5 to 18 parts of the fire retardant; and
d. 0 to 10 parts of other aids;
wherein a sum of parts by weight of the four components a, b, c, and d is 100,
the content of the phenols based on the total weight of the polycarbonate composition is less than or equal to 100 ppm;
the PC resin consists of one or mixtures of the component I and/or the component II:
component I: the PC resin with the K value of 300000-500000;
component II: the aromatic PC resin with the K value less than 300000;
wherein the structural formula of the phenols is shown as Formula (1):

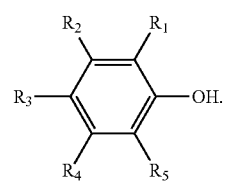

Formula (1)

Wherein, $R_1$ and $R_5$ represent the hydrogen group, the alkyl, the alkoxy, the hydroxyl, the carboxyl or the carbonyl, and the ester group, except for the hindered group; and $R_2$, $R_3$ and $R_4$ represent the substituent containing hydrogen atoms, preferably the hydrogen atom.

Wherein, the K value is an injection molding flow index of the PC resin, and is a ratio of a viscosity-average molecular weight to a content of terminal phenolic groups. The K value reflects a real flowability of the PC resin. The flowability of the PC resin is in direct proportion to a viscosity and its distribution of the PC resin and to a composition of terminal parts of molecular segments. Wherein, the viscosity-average molecular weight [Mv] means a value obtained by calculating the Schnell viscosity equation, i.e. $\eta=1.23\times10^{-4}\mathrm{Mv}^{0.83}$, after determining an intrinsic viscosity [η] (unit: dl/g) by a measurement using an Ubbelohde viscometer with chloromethane as a solvent under a temperature of 20° C. The content of terminal groups of the resin is measured by an in-situ infrared method, which may avoid disturbances from water in the air and from substances absorbed by water in background and by other hydroxyl groups. The pressure is set as $10^{-3}$ Pa, and a heating process is holding for 3 to 4 hours after heating from a room temperature to 450° C. After an in-situ cell is put into an infrared cartridge to perform a background scanning followed by being pretreated, then a spectrogram is scanned after the temperature is cooled to the room temperature. An infrared scanning is set as that a scanning time is 64 and a resolution is 4 $\mathrm{cm}^{-1}$. The content of terminal hydroxyls is obtained by absorption peaks. Wherein, a test method of the content of the phenols is as follow: weighing a certain amount of the polycarbonate composition, followed by performing a Soxhlet extraction using methanol of 85° C., and then inputting the extracted polycarbonate composition into a styrene-type adsorption column at a certain flow rate under the room temperature, and creating a standard curve of standard phenols solutions in different concentrations, and calculating the content of total phenols in the system according to a specific efflux time by an extrapolation method.

In the PC resin, a percentage of the component I accounts for 50 wt % to 70 wt % of a total weight of the PC resin; and a percentage of the component II accounts for 30 wt % to 50 wt % of the total weight of the PC resin.

The content of the phenols based on the total weight of the polycarbonate composition is less than or equal to 80 ppm; preferably less than or equal to 50 ppm. When the content of the phenols based on the total weight of the polycarbonate composition is greater than 100 ppm, a reversible unlock reaction is caused under effects of heat and shear, resulting in a degradation of the polycarbonate and generating a sequence of hidden dangers. Besides, the content of the phenols that is greater than 100 ppm will lead to unstable terminal groups of the polymer.

Preferably, the component I is a PC resin with the K value of 320000 to 480000.

A preparation method of the above-described PC resin with the K value of 300000-500000 is as follow: a dihydroxyl compound and a carbonate precursor (e.g. a phosgene, a halogenated formate, a carbonate or a carbonic ester) react in the presence of generally an acid acceptor and a molecular weight modifier, to produce the PC resin.

The aromatic PC resin of the component II is selected from an aromatic PC resin prepared by a phosgene method and/or a melting method.

The rubber-modified graft polymer is selected from one or more of a rubber-modified graft polymer prepared by a bulk polymerization method, a rubber-modified graft polymer prepared by an emulsion polymerization method, and a rubber-modified graft polymer prepared by a bulk-suspension polymerization method.

The bulk polymerization method includes five steps such as dissolving rubber, prepolymerizing, polymerizing, devolatilizing and pelletizing, more particularly, dissolving a rubber in ethylbenzene and styrene; adding monomers in accordance with a formulation amount to prepare into a raw material solution, inputting the prepared raw material solution into a prepolymerizer to perform prepolymerization; during polymerizing, grafting the monomers to the rubber, copolymerizing the monomers at the same time, separating from the solution, forming a discontinuous phase dispersed in a continuous phase in the raw material solution, after enough monomers are polymerized, a copolymer in the discontinuous phase becomes a continuous phase, and the grafted rubber forms a discontinuous phase which is dispersed in the continuous copolymer phase, thereby accomplishing a phase transition; finally, performing further polymerization, vacuum degassing, extruding, cooling and pelletizing to obtain a final product.

The bulk-suspension polymerization method includes: regulating a rubber and a monomer solution in accordance with a formula, and adding a polymerization regulator and a radical initiator at the same time; performing bulk polymerization on a monomer mixture at 80° C. to 120° C., continuously stirring during polymerizing, and adding deionized water and a suspending agent into the mixture to ensure that the mixture is dispersed; and then performing suspension polymerization by using a radical catalyst, performing coagulating, filtering, washing, dehydrating and drying after obtaining a certain polymerization degree, and then pelletizing to obtain a product.

The emulsion polymerization method includes: grafting a rubber by controlling a polymerization temperature at 50° C. to 80° C., and adding a monomer mixture into a rubber latex in the presence of an initiator, deionized water, an emulsifier and a cross-linking agent, and finally pelletizing to obtain a product after performing washing, dehydrating and drying.

Wherein, the rubber-modified graft polymer is selected from graft polymers containing the following b.1 on b.2 in parts by weight:

b.1 5 to 95 parts of a mixture of b.1.1 and b.1.2:

b.1.1 50 to 95 parts of one or more of styrene, styrene derivatives such as α-methyl styrene, p-benzyl styrene and divinyl styrene, C1-C8 alkyl methacrylate, C1-C8 alkyl acrylate, dimethyl siloxane, phenyl siloxane, and multi-alkyl siloxane;

b.1.2 5 to 50 parts of one or more of acrylonitrile, methyl acrylonitrile, C1-C8 alkyl methacrylate, and C1-C8 alkyl acrylate;

b.2 5 to 95 parts of one or more of polybutadiene, polyisoprene, a random copolymer and a block copolymer of styrene-butadiene, a random copolymer and a block copolymer of acrylonitrile-butadiene, a copolymer of polybutadiene and polyisoprene, a copolymer of ethylene and α-alkene, a copolymer of ethylene and α-unsaturated carboxylate, a terpolymer of ethylene-propene-nonconjugated diene, an acryloyl rubber, and an organic siloxane rubber.

Preferably, the rubber-modified graft polymer is selected from one or more of a copolymer of acrylonitrile-styrene AS, a graft copolymer of acrylonitrile-butadiene-styrene ABS, a copolymer of methyl methacrylate-acrylonitrile-butadiene-styrene MABS, a terpolymer of acrylonitrile-styrene-acrylic acid ASA, and a graft copolymer of methyl methacrylate-butadiene-styrene MBS; preferably the graft copolymer of acrylonitrile-butadiene-styrene ABS; wherein, a particle diameter of the MBS is preferably 0.1 μm to 0.5 μm, a particle diameter of the ABS in the bulk polymerization method is preferably 0.1 μm to 2 μm, and a particle diameter of the ABS in the emulsion polymerization method is preferably 0.05 μm to 0.2 μm.

The fire retardant is selected from a halogen-based fire retardant or a halogen-free fire retardant, preferably the halogen-free fire retardant; the halogen-based fire retardant is selected from one or more of a brominated polystyrene, a brominated polyphenyl ether, a brominated bisphenol A type epoxy resin, a brominated styrene-maleic anhydride copolymer, a brominated epoxy resin, a brominated phenoxy resin, decabromodiphenyl oxide, decabromodiphenyl, a brominated polycarbonate, perbromotricyclopentadecane or a brominated aromatic cross-linked polymer, preferably the brominated polystyrene; the halogen-free fire retardant is selected from one or more of a nitrogen-containing fire retardant, a phosphorus-containing fire retardant or a nitrogen- and phosphorus-containing fire retardant, preferably the phosphorus-containing fire retardant.

The phosphorus-containing fire retardant is selected from one or more of triphenyl phosphate, tritolyl phosphate, tolyl diphenyl phosphate, trixylyl phosphate, tri(2,4,6-trimethyl phenyl) phosphate, tri(2,4-di-tert-butyl phenyl) phosphate, tri(2,6-di-tert-butyl phenyl) phosphate, resorcinol bis(diphenyl phosphate), hydroquinone bis(diphenyl phosphate), bisphenol A-bis(diphenyl phosphate), resorcinol bis(2,6-di-tert-butyl phenyl phosphate), and hydroquinone bis(2,6-dimethyl phenyl phosphate).

The other aids of the component d are selected from one or more of a stabilizer, a fire retardant synergist, an anti-dripping agent, a lubricant, a releasing agent, a plasticizer, a filler and a colorant.

The suitable stabilizer includes an organic phosphite such as triphenyl phosphite, tri(2,6-dimethyl phenyl) phosphite and tri(nonyl phenyl) phosphite, dimethyl phenyl phosphonate, trimethyl phosphate and the like; and one or combinations of the organic phosphite, an alkylated monophenol or polyphenol, an alkylated reaction product of a polyphenol and a diene, a butylated reaction product of p-cresol or dicyclopentadiene, alkylated hydroquinones, hydroxylated thiodiphenyl ethers, alkylene-bisphenol, benzyl compounds, polyol esters, benztriazoles, and bonzo phenones.

The suitable plasticizer is phthalate.

The suitable releasing agent includes metallic stearates, alkyl stearates, pentaerythritol stearates, paraffin, lignite wax, and the like.

The suitable colorant includes various pigments, and dyes.

A preparation method of the above-described polycarbonate composition includes the following steps:

1) formulating the phenols and dimethyl siloxane into the phenols pretreated solution;

2) blending the phenols pretreated solution and the PC resin in a high-speed mixer to obtain a pretreated PC resin;

3) After weighing the pretreated PC resin, the rubber-modified graft polymer, the fire retardant and other aids in proportion, blending by the high-speed mixer or a mixer, extruding, cooling by means of water, and pelletizing to obtain a columnar particulate polycarbonate composition.

Because the polycarbonate composition of the present invention has an excellent long-term heat stability and weathering property, no appearance defects and excellent mechanical property, the polycarbonate composition of the present invention can be used in outdoor and indoor application fields, for example shell parts of various types and sizes, household appliances such as a TV set, a printer, a modern shell, and a display shell, or automobile parts for outdoor use, an enclosure or cover in a building field, and a housing and a frame for an electrical appliance.

Compared with the prior art, the present invention has the following advantageous effects:

according to the present invention, when the phenols which are added in a polycarbonate composition formula, based on a total weight of the polycarbonate composition does not exceed 100 ppm, and the K value of the component I of the PC resin is adjusted between 300000 and 500000 and the K value of the component II is adjusted to be less than 300000, the obtained polycarbonate composition has excellent heat resistance and flowability, particularly suitable for occasions with relatively high requirements for an operating environment.

DETAILED DESCRIPTION OF THE PREFERRED EMBODIMENT

The present invention will be further described below by detailed implementations, the following embodiments are preferred implementations of the present invention, but the implementations of the present invention are not limited by the following embodiments.

Testing standards or methods of various properties:

a testing method of a content of phenols: after 2 g of a polycarbonate composition was weighed using an electronic balance, a sample was put into a constant temperature oven of which the temperature was uniform and stable, for 2 hours with a preset temperature of 120° C. followed by being put into a Soxhlet extractor device to perform extracting with methanol, an extracting temperature was 85° C., and the time was 48 hours; after an extraction solution was set into a constant temperature, 20 μL of the extraction solution was extracted with a filter screen and then was injected into an adsorption column of C18 to perform separation and quantifying with the help of a mobile phase (methanol:purified water=90:10) at a flow rate of 10 ml/min; after a standard curve was created by creating standard solutions of 1 ppm, 5 ppm, 10 ppm and 20 ppm, the content of the phenols may be calculated by a specific efflux time of a standard sample and an extrapolation method;

a testing method of a flowability (3 mm, 1.5 mm, 0.35 mm): strips with different thicknesses were prepared with a strip mold which had an acicular pouring gate and a pinpoint gate of 1.0 mm, while an injection temperature was 280° C., an injection speed was 80%, and an injection pressure was 80%, lengths of cooled strips were measured finally, the longer the length, the better the flowability.

A testing method of an impact property: after a sample strip for testing was obtained by a 80-ton injection molding machine made by Nissei Plastic Industrial Co., Ltd. under a condition that a barrel temperature was 280° C. and a mold temperature was 100° C., an Izod impact value with a notch was measured by an Izod impact tester (made by Toyo Seiki Seisaku-Sho, Ltd.) according to ASTM D265;

a testing method of a thermal resistance: by using the 80-ton injection molding machine made by Nissei Plastic Industrial Co., Ltd., the polycarbonate composition was stayed for 5 minutes while the barrel temperature was 280° C., and then the polycarbonate composition was injected; intrinsic viscosities before and after injection were measured, a stability of the intrinsic viscosity was evaluated; the smaller the absolute value of a difference between "an intrinsic viscosity before injection" and "an intrinsic viscosity after injection", the more preferable. Herein, when the absolute value of the difference is less than 0.03 dl/g, the thermal resistance was evaluated as "good (G)", when the absolute value of the difference is greater than 0.03 dl/g and less than 0.10 dl/g, the thermal resistance was evaluated as "medium (M)", and when the absolute value of the difference is greater than 0.10 dl/g, the thermal resistance was evaluated as "not good (NG)".

The PC resin used in the present invention was prepared according to the following method:

component a-1: a PC resin with a K value of 300000-500000, a preparation method thereof: an interface polycondensation method was used, a bisphenol of sodium hydroxide and a carbonate precursor (e.g. a phosgene, a halogenated formate, a carbonate or acid ester) dissolved in dichloromethane reacted on an interphase boundary in the presence of a catalyst triethylamine to generate a low molecular polycarbonate, and then under a condition that a pH value was adjusted below 11 and a m/a ratio was 0.5, a polycarbonate final product with a specific K value was generated by controlling a reaction time for further polycondensation;

wherein:
PC1-1 is a PC resin, with the K value of 300000;
PC1-2 is a PC resin, with the K value of 320000;
PC1-3 is a PC resin, with the K value of 500000.

Component a-2: an aromatic PC resin with the K value less than 300000;

wherein,
PC2-1 was an aromatic PC resin, with the K value of 250000, and a percentage accounts for 30 wt % of a total weight of the PC resin; a preparation method thereof: a low molecular polycarbonate was generated by a reaction on the interphase boundary in the presence of a catalyst triethylamine, and under a condition that the pH value was adjusted below 11 and the m/a ratio was 0.3, a polycarbonate final product with a specific K value of 250000 was generated by controlling the reaction time for further polycondensation.

Component a-3:
PC3-1, with the K value of 600000; a preparation method thereof: a low molecular polycarbonate was generated by a reaction on the interphase boundary in the presence of a catalyst triethylamine, and under a condition that the pH value was adjusted below 11 and the m/a ratio was 0.8, a polycarbonate final product with a specific K value of 600000 was generated by controlling the reaction time.

The phenols used in the present invention:
phenol: (TCI, Shanghai);
4-methylphenols: (Aladdin); and
xylenols: (Aladdin);
rubber-modified graft polymers used in the present invention:
a component b-1: ABS2 Bulk polymerization method 8391 (Gaoqiao, Shanghai);
a component b-2: ABS1 Emulsion polymerization method 757 (Chi Mei, Taiwan); and
a component b-3: MBS EM500 (LG, Korea);
a fire retardant used in the present invention:
a component c: BDP, bisphenol A-bis(diphenyl phosphate) (ADEKA);
other aids used in the present invention:
a component d-1: PTFE (polytetrafluoroethylene), as an anti-dripping agent; and
a component d-2: PETS (Pentaerythritol stearate), as a releasing agent.

Embodiments 1-9 and Comparative Embodiments 1-9

Preparation of the Polycarbonate Composition

Formulating the phenols and dimethyl siloxane into the phenols pretreated solution; blending the phenols pretreated solution and the PC resin in a high-speed mixer to obtain a pretreated PC resin; after weighing the pretreated PC resin, the rubber-modified graft polymer, the fire retardant and other aids in proportion according to formulas of Table 1, blending by the high-speed mixer or a mixer, extruding, cooling by means of water, and pelletizing to obtain a columnar particulate polycarbonate composition.

TABLE 1

Specific proportions (parts by weight) and property testing results of Embodiments 1-9 and Comparative Embodiments 1-9

|  | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| component a-1 | PC1-1 | PC1-2 | PC1-3 | PC1-1 | PC1-2 | PC1-3 | PC1-1 | PC1-2 | PC1-3 |
|  | 21 | 42 | 56 | 21 | 42 | 56 | 21 | 42 | 56 |
| component a-2 | PC2-1 | PC2-1 | PC2-1 | PC2-1 | PC2-1 | PC2-1 | PC2-1 | PC2-1 | PC2-1 |
|  | 9 | 18 | 24 | 9 | 18 | 24 | 9 | 18 | 24 |
| component a-3 |  |  |  |  |  |  |  |  |  |
| component b-1 | 50 |  |  | 50 |  |  | 50 |  |  |
| component b-2 |  |  | 8 |  |  | 8 |  |  | 8 |
| component b-3 |  | 34 |  |  | 34 |  |  | 34 |  |
| component c | 19 | 5 | 11 | 19 | 5 | 11 | 19 | 5 | 11 |
| component d-1 | 0.5 | 0.5 | 0.5 | 0.5 | 0.5 | 0.5 | 0.5 | 0.5 | 0.5 |
| component d-2 | 0.5 | 0.5 | 0.5 | 0.5 | 0.5 | 0.5 | 0.5 | 0.5 | 0.5 |
| content of the phenols (ppm) | 90 | 95 | 100 | 75 | 80 | 64 | 50 | 43 | 32 |
| flowability (3 mm) | 360 | 400 | 380 | 480 | 495 | 480 | 500 | 560 | 520 |

TABLE 1-continued

Specific proportions (parts by weight) and property testing results of Embodiments 1-9 and Comparative Embodiments 1-9

| | | | | | | | | | |
|---|---|---|---|---|---|---|---|---|---|
| flowability (1.5 mm) | 112 | 130 | 88 | 240 | 280 | 260 | 370 | 390 | 360 |
| flowability (0.35 mm) | 60 | 80 | 72 | 86 | 98 | 87 | 124 | 180 | 130 |
| heat resistance | M | M | M | M | G | G | G | G | G |
| impact property | 432 | 500 | 430 | 530 | 560 | 536 | 550 | 635 | 556 |

| | Comparative Embodiment 1 | Comparative Embodiment 2 | Comparative Embodiment 3 | Comparative Embodiment 4 | Comparative Embodiment 5 | Comparative Embodiment 6 | Comparative Embodiment 7 | Comparative Embodiment 8 | Comparative Embodiment 9 |
|---|---|---|---|---|---|---|---|---|---|
| component a-1 | PC1-1 | PC1-2 | PC1-3 | PC1-1 | PC1-2 | PC1-3 | | | |
| | 21 | 42 | 56 | 21 | 42 | 56 | | | |
| component a-2 | PC2-1 | PC2-1 | PC2-1 | PC2-1 | PC2-1 | PC2-1 | PC2-1 | PC2-1 | PC2-1 |
| | 9 | 18 | 24 | 9 | 18 | 24 | 9 | 18 | 24 |
| component a-3 | | | | | | | PC3-1 | PC3-1 | PC3-1 |
| | | | | | | | 21 | 42 | 56 |
| component b-1 | 50 | | | 50 | | | 50 | | |
| component b-2 | | | 8 | | | 8 | | | 8 |
| component b-3 | | 34 | | | 34 | | | 34 | |
| component c | 19 | 5 | 11 | 19 | 5 | 11 | 19 | 5 | 11 |
| component d-1 | 0.5 | 0.5 | 0.5 | 0.5 | 0.5 | 0.5 | 0.5 | 0.5 | 0.5 |
| component d-2 | 0.5 | 0.5 | 0.5 | 0.5 | 0.5 | 0.5 | 0.5 | 0.5 | 0.5 |
| content of the phenols (ppm) | 122 | 175 | 250 | 195 | 380 | 443 | 100 | 164 | 232 |
| flowability (3 mm) | 222 | 288 | — | 245 | — | — | 118 | 260 | 300 |
| flowability (1.5 mm) | 32 | 45 | 40 | — | 13 | — | 28 | 33 | 22 |
| flowability (0.35 mm) | — | — | — | — | — | — | — | — | — |
| heat resistance | NG | NG | NG | NG | NG | NG | NG | NG | NG |
| impact property | 332 | 380 | 323 | 350 | 380 | 335 | 300 | 400 | 283 |

Wherein: — represents the flowability can't be normally tested.

It may be seen from a comparison of Embodiments with Comparative Embodiments in Table 1 that: according to the present invention, when the phenols which are added in a polycarbonate composition formula, based on a total weight of the polycarbonate composition does not exceed 100 ppm, and the K value of component I of the PC resin is adjusted between 300000 and 500000 and the K value of component II is adjusted to be less than 300000, the obtained polycarbonate composition has excellent heat resistance and flowability, particularly suitable for occasions with relatively high requirements for an operating environment.

What is claimed:
1. A polycarbonate composition, comprising the following components in parts by weight:
a. 35 to 75 parts of a polycarbonate resin;
b. 8 to 35 parts of a rubber-modified graft polymer;
c. 5 to 20 parts of a fire retardant; and
d. 0 to 10 parts of other aids;
wherein a sum of parts by weight of the four components a, b, c, and d is 100,
a content of phenols based on a total weight of the polycarbonate composition is less than or equal to 100 ppm;
the polycarbonate resin consists of a component I and a component II:
component I: a polycarbonate resin with a K value of 320000-480000;
component II: an aromatic polycarbonate resin with the K value less than 300000;
wherein a structural formula of the phenols is shown as Formula (1):

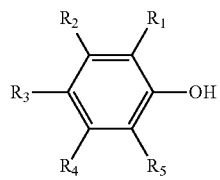

wherein, $R_1$ and $R_5$ represent a hydrogen group, an alkyl, an alkoxy, a hydroxyl, a carboxyl or a carbonyl, and an ester group, except for a hindered group; and $R_2$, $R_3$ and $R_4$ represent a substituent containing a hydrogen atom.

2. The polycarbonate composition according to claim 1, wherein in the polycarbonate resin, the component I accounts for 50 wt % to 70 wt % of a total weight of the polycarbonate resin; and the component II accounts for 30 wt % to 50 wt % of the total weight of the polycarbonate resin.

3. The polycarbonate composition according to claim 1, wherein the aromatic resin of the component II is selected from an aromatic polycarbonate resin prepared by a phosgene method and/or a melting method.

4. The polycarbonate composition according to claim 1, wherein the content of the phenols based on the total weight of the polycarbonate composition is less than or equal to 80 ppm.

5. The polycarbonate composition according to claim 1, wherein the rubber-modified graft polymer is selected from one or more of a rubber-modified graft polymer prepared by a bulk polymerization method, a rubber-modified graft polymer prepared by an emulsion polymerization method, and a rubber-modified graft polymer prepared by a bulk-suspension polymerization method.

6. The polycarbonate composition according to claim 1, wherein the rubber-modified graft polymer is selected from graft polymers containing the following b.1 on b.2 in parts by weight:
   b.1) 5 to 95 parts of a mixture of b.1.1 and b.1.2:
   b.1.1) 50 to 95 parts of one or more of styrene, styrene derivatives comprising α-methyl styrene, p-benzyl styrene and divinyl styrene, C1-C8 alkyl methacrylate, C1-C8 alkyl acrylate, dimethyl siloxane, phenyl siloxane, and multi-alkyl siloxane;
   b.1.2) 5 to 50 parts of one or more of acrylonitrile, methyl acrylonitrile, C1-C8 alkyl methacrylate, and C1-C8 alkyl acrylate;
   b.2) 5 to 95 parts of one or more of polybutadiene, polyisoprene, a random copolymer and a block copolymer of styrene-butadiene, a random copolymer and a block copolymer of acrylonitrile-butadiene, a copolymer of polybutadiene and polyisoprene, a copolymer of ethylene and α-alkene, a copolymer of ethylene and α-unsaturated carboxylate, a terpolymer of ethylene-propene-nonconjugated diene, an acryloyl rubber, and an organic siloxane rubber.

7. The polycarbonate composition according to claim 6, wherein the rubber-modified graft polymer is selected from one or more of a copolymer of acrylonitrile-styrene, a graft copolymer of acrylonitrile-butadiene-styrene, a copolymer of methyl methacrylate-acrylonitrile-butadiene-styrene, a terpolymer of acrylonitrile-styrene-acrylic acid, and a graft copolymer of methyl methacrylate-butadiene-styrene; wherein, a particle diameter of the methyl methacrylate-butadiene-styrene is 0.1 μm to 0.5 μm, a particle diameter of the acrylonitrile-butadiene-styrene in the bulk polymerization method is 0.1 μm to 2 μm, and a particle diameter of the acrylonitrile-butadiene-styrene in the emulsion polymerization method is 0.05 μm to 0.2 μm.

8. The polycarbonate composition according to claim 1, wherein the fire retardant is selected from a halogen-based fire retardant or a halogen-free fire retardant; the halogen-based fire retardant is selected from one or more of a brominated polystyrene, a brominated polyphenyl ether, a brominated bisphenol A type epoxy resin, a brominated copolymer of styrene-maleic anhydride, a brominated epoxy resin, a brominated phenoxy resin, decabromodiphenyl oxide, decabromodiphenyl, a brominated polycarbonate, perbromotricyclopentadecane or a brominated aromatic cross-linked polymer; the halogen-free fire retardant is selected from one or more of a nitrogen-containing fire retardant, a phosphorus-containing fire retardant or a nitrogen- and phosphorus-containing fire retardant.

9. The polycarbonate composition according to claim 8, wherein the phosphorus-containing fire retardant is selected from one or more of triphenyl phosphate, tritolyl phosphate, tolyl diphenyl phosphate, trixylyl phosphate, tri(2,4,6-trimethyl phenyl) phosphate, tri(2,4-di-tert-butyl phenyl) phosphate, tri(2,6-di-tert-butyl phenyl) phosphate, resorcinol bis (diphenyl phosphate), hydroquinone bis(diphenyl phosphate), bisphenol A-bis(diphenyl phosphate), resorcinol bis(2,6-di-tert-butyl phenyl phosphate), and hydroquinone bis(2,6-dimethyl phenyl phosphate).

10. The polycarbonate composition according to claim 1, wherein the other aids of the component d are selected from one or more of a stabilizer, a fire retardant synergist, an anti-dripping agent, a lubricant, a releasing agent, a plasticizer, a filler, and a colorant.

11. A preparation method of the polycarbonate composition according to claim 1, comprising the following steps:
   1) formulating phenols and dimethyl siloxane into a phenols pretreated solution;
   2) blending the phenols pretreated solution and a polycarbonate resin in a high-speed mixer to obtain a pretreated polycarbonate resin;
   3) after weighing the pretreated polycarbonate resin, a rubber-modified graft polymer, a fire retardant, and other aids in proportion, blending by the high-speed mixer or a mixer, extruding, cooling by means of water, and pelletizing to obtain a columnar particulate polycarbonate composition.

12. The polycarbonate composition according to claim 1, comprising the following components in parts by weight:
   a. 42 to 70 parts of the polycarbonate resin;
   b. 8 to 30 parts of the rubber-modified graft polymer;
   c. 5 to 18 parts of the fire retardant; and
   d. 0 to 10 parts of other aids;
   wherein a sum of parts by weight of the four components a, b, c, and d is 100,
   a content of phenols based on a total weight of the polycarbonate composition is less than or equal to 100 ppm;
   the polycarbonate resin consists of a component I and a component II:
   component I: a polycarbonate resin with the K value of 320000-480000;
   component II: an aromatic polycarbonate resin with the K value less than 300000;
   wherein a structural formula of the phenols is shown as Formula (1):

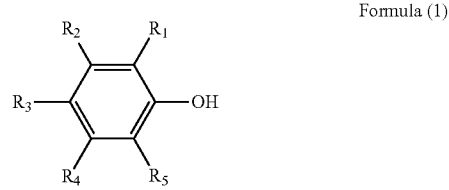

Formula (1)

wherein, $R_1$ and $R_5$ represent a hydrogen group, an alkyl, an alkoxy, a hydroxyl, a carboxyl or a carbonyl, and an ester group, except for a hindered group; and $R_2$, $R_3$ and $R_4$ represent a substituent containing a hydrogen atom.

13. The polycarbonate composition according to claim 12, wherein in the polycarbonate resin, the component I accounts for 50 wt % to 70 wt % of a total weight of the polycarbonate resin; and the component II accounts for 30 wt % to 50 wt % of the total weight of the polycarbonate resin.

14. The polycarbonate composition according to claim 12, wherein the aromatic resin of the component II is selected from an aromatic polycarbonate resin prepared by a phosgene method and/or a melting method.

15. The polycarbonate composition according to claim 12, wherein the content of the phenols based on the total weight of the polycarbonate composition is less than or equal to 80 ppm.

16. The polycarbonate composition according to claim 12, wherein the rubber-modified graft polymer is selected from one or more of a rubber-modified graft polymer prepared by a bulk polymerization method, a rubber-modified graft polymer prepared by an emulsion polymerization method, and a rubber-modified graft polymer prepared by a bulk-suspension polymerization method.

17. The polycarbonate composition according to claim 12, wherein the rubber-modified graft polymer is selected from graft polymers containing the following b.1 on b.2 in parts by weight:
  b.1) 5 to 95 parts of a mixture of b.1.1 and b.1.2:
  b.1.1) 50 to 95 parts of one or more of styrene, styrene derivatives comprising α-methyl styrene, p-benzyl styrene and divinyl styrene, C1-C8 alkyl methacrylate, C1-C8 alkyl acrylate, dimethyl siloxane, phenyl siloxane, and multi-alkyl siloxane;
  b.1.2) 5 to 50 parts of one or more of acrylonitrile, methyl acrylonitrile, C1-C8 alkyl methacrylate, and C1-C8 alkyl acrylate;
  b.2) 5 to 95 parts of one or more of polybutadiene, polyisoprene, a random copolymer and a block copolymer of styrene-butadiene, a random copolymer and a block copolymer of acrylonitrile-butadiene, a copolymer of polybutadiene and polyisoprene, a copolymer of ethylene and α-alkene, a copolymer of ethylene and α-unsaturated carboxylate, a terpolymer of ethylene-propene-nonconjugated diene, an acryloyl rubber, and an organic siloxane rubber.

18. The polycarbonate composition according to claim 17, wherein the rubber-modified graft polymer is selected from one or more of a copolymer of acrylonitrile-styrene, a graft copolymer of acrylonitrile-butadiene-styrene, a copolymer of methyl methacrylate-acrylonitrile-butadiene-styrene, a terpolymer of acrylonitrile-styrene-acrylic acid, and a graft copolymer of methyl methacrylate-butadiene-styrene; wherein, a particle diameter of the methyl methacrylate-butadiene-styrene is 0.1 μm to 0.5 μm, a particle diameter of the acrylonitrile-butadiene-styrene in the bulk polymerization method is 0.1 μm to 2 μm, and a particle diameter of the acrylonitrile-butadiene-styrene in the emulsion polymerization method is 0.05 μm to 0.2 μm.

19. The polycarbonate composition according to claim 12, wherein the fire retardant is selected from a halogen-based fire retardant or a halogen-free fire retardant; the halogen-based fire retardant is selected from one or more of a brominated polystyrene, a brominated polyphenyl ether, a brominated bisphenol A type epoxy resin, a brominated copolymer of styrene-maleic anhydride, a brominated epoxy resin, a brominated phenoxy resin, decabromodiphenyl oxide, decabromodiphenyl, a brominated polycarbonate, perbromotricyclopentadecane or a brominated aromatic cross-linked polymer; the halogen-free fire retardant is selected from one or more of a nitrogen-containing fire retardant, a phosphorus-containing fire retardant or a nitrogen- and phosphorus-containing fire retardant.

20. The polycarbonate composition according to claim 19, wherein the phosphorus-containing fire retardant is selected from one or more of triphenyl phosphate, tritolyl phosphate, tolyl diphenyl phosphate, trixylyl phosphate, tri(2,4,6-trimethyl phenyl) phosphate, tri(2,4-di-tert-butyl phenyl) phosphate, tri(2,6-di-tert-butyl phenyl) phosphate, resorcinol bis (diphenyl phosphate), hydroquinone bis(diphenyl phosphate), bisphenol A-bis(diphenyl phosphate), resorcinol bis(2,6-di-tert-butyl phenyl phosphate), and hydroquinone bis(2,6-dimethyl phenyl phosphate).

21. The polycarbonate composition according to claim 12, wherein the other aids of the component d are selected from one or more of a stabilizer, a fire retardant synergist, an anti-dripping agent, a lubricant, a releasing agent, a plasticizer, a filler, and a colorant.

22. A preparation method of the polycarbonate composition according to claim 12, comprising the following steps:
  1) formulating phenols and dimethyl siloxane into a phenols pretreated solution;
  2) blending the phenols pretreated solution and a polycarbonate resin in a high-speed mixer to obtain a pretreated polycarbonate resin;
  3) after weighing the pretreated polycarbonate resin, a rubber-modified graft polymer, a fire retardant, and other aids in proportion, blending by the high-speed mixer or a mixer, extruding, cooling by means of water, and pelletizing to obtain a columnar particulate polycarbonate composition.

* * * * *